A. T. BOOTH.
SWIVEL CONNECTION OR COUPLING.
APPLICATION FILED DEC. 9, 1910.
994,815.
Patented June 13, 1911.
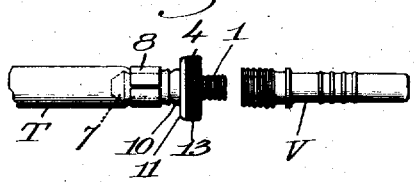
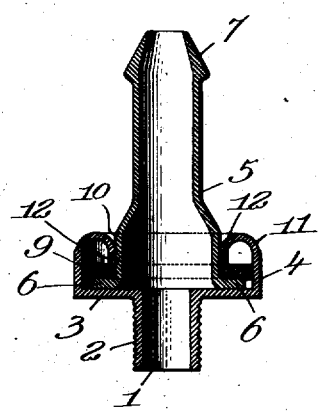
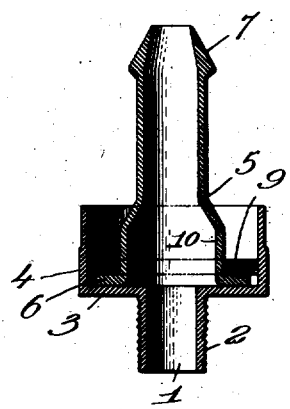

UNITED STATES PATENT OFFICE.

ALBERT T. BOOTH, OF WATERBURY, CONNECTICUT.

SWIVEL CONNECTION OR COUPLING.

994,815.  Specification of Letters Patent.  Patented June 13, 1911.

Application filed December 9, 1910. Serial No. 596,457.

*To all whom it may concern:*

Be it known that I, ALBERT T. BOOTH, a citizen of the United States, and resident of Waterbury, county of New Haven, State of Connecticut, have invented an Improvement in Swivel Connections or Couplings, of which the following description, in connection with the accompanying drawing, is a specification, like characters on the drawing representing like parts.

This invention has for its object the production of a simple and efficient swivel connection or coupling more particularly designed for connecting temporarily the supply tube of an air pump with the valve of a bicycle, automobile or other pneumatic tire.

The construction of my novel swivel connection is such that it can be made readily and at a low cost, it can be quickly and easily applied to or detached from the tire-valve, and becomes absolutely fluid-tight the instant it is subjected to any pressure in the supply tube.

As is well known the ordinary tire-valve is provided with a threaded end, and into this threaded end one member of my improved coupling is screwed when it is desired to inflate the tire.

The novel features of my invention will be fully described in the subjoined specification and particularly pointed out in the following claims.

Figure 1 is a side elevation of a swivel connection or coupling embodying my invention, attached to a piece of tubing, and with a common form of tire-valve shown adjacent the connection; Fig. 2 is an enlarged longitudinal section of the connection, to show more clearly the construction thereof; Fig. 3 is a similar view, showing the members of the swivel connection assembled, but before the final step in the manufacture has been effected.

In accordance with my invention the swivel connection comprises a coupling member having a chambered head and a nipple member connected therewith, one member being rotatable relatively to the other, and with means to form a fluid-tight joint for the connection when in use. Herein the coupling member consists of a tubular neck 1 externally threaded at 2 and having at one end a laterally extended, circular enlargement 3 provided with a peripheral flange 4 extended oppositely to the neck, Figs. 2 and 3. The other member of the connection is shown as a tubular nipple 5 having a laterally-extended, circular flange 6 at one end, readily formed by turning out by spinning or otherwise one end of the nipple, the latter at its other end being slightly tapered, as at 7, to facilitate insertion thereof into the usual rubber supply tube T, Fig. 1, of a pump. A suitable clamp 8 serves to secure the nipple firmly in the end of the tube, in a manner well known. The diameter of the flanged end 6 is such that it will loosely enter the circular flange 4, and when so located the bores of the nipple and the neck 1 are axially alined. An annular disk-like packing 9 of leather, rubber or other suitable material is pushed onto the somewhat enlarged base portion 10 of the nipple and is seated upon the flanged end 6, the packing preferably extending to the inner wall of the flange 4.

In the process of manufacture, the coupling member is made with its flange in the form of a cylinder, see Fig. 3, and then the nipple and packing are inserted therein, as shown. Now by means of a suitable tool the free edge of the flange is turned inward toward the nipple base 5, as at 11, Fig. 2, and then axially to form a reëntrant lip 12 which snugly surrounds and laterally supports the adjacent portion of the nipple and is turned toward and against the packing 9. It will now be seen that the lateral enlargement 3, with its circular flange 4 and reëntrant lip 12, forms a chambered head centrally apertured for the reception of the nipple, and within such head loosely enters the flanged end 6 of the nipple member, and the packing 9. Ordinarily the coupling and nipple members can be rotated relatively, as is necessary when applying the coupling to a valve V, Fig. 1, the exterior of the flange 4 being preferably milled or roughened, at 13, Fig. 1, to facilitate manipulation. When, however, the connection is subjected to internal fluid pressure the flanged end 6 is forced away from the enlargement 3 and the packing is pinched or compressed between the inturned edge of the reëntrant lip 12 and the flanged end 6, making a fluid-tight joint thereat between the two members of the coupling, the joint becoming tighter as the pressure is increased.

The swivel connection constructed in accordance with my invention is exceedingly simple, it can be made readily and at a low cost, and will not get out of order, nor can the members become separated accidentally, for the lip 12 overhangs not only the packing but also the flanged end 6 of the nipple member, the reëntrant lip also forming a strong and closely surrounding lateral support for the nipple member and preventing it from working out of alinement with the coupling member.

Changes or modifications in details of construction and arrangement may be made by those skilled in the art without departing from the spirit and scope of my invention as set forth in the claims annexed hereto.

Having fully described my invention, what I claim as new and desire to secure by Letters Patent is:

1. In a swivel connection, a coupling member having a threaded tubular neck provided at one end with a laterally extended, circular enlargement having an oppositely extended peripheral flange, a tubular nipple having a laterally-flanged end to extend within said peripheral flange and seat upon said circular enlargement, an annular disk-like packing surrounding the nipple and seated on its flanged end, and a reëntrant retaining lip on the peripheral flange axially turned toward the packing adjacent and closely surrounding the nipple to laterally support the same, said packing closing the joint between the flanged end of the nipple and the edge of the reëntrant lip while permitting relative rotation of said parts.

2. In a swivel connection, two tubular members having opposed and adjacent laterally enlarged ends, a circular flange on one of said ends loosely surrounding the end of the other member, said flange being turned inward and then axially toward the surrounded end, and an annular disk-like packing interposed between said surrounded end and the inner edge of said axially turned portion of the flange, to form a fluid-tight joint between the members of the connection, the axially turned reëntrant, tubular portion of the flange preventing axial and lateral separation of the tubular members while permitting relative rotation thereof.

3. In a swivel connection, a member having a threaded coupling neck provided at one end with a flat, circular enlargement with a circular flange extended oppositely from the neck, a coöperating nipple member having a laterally-flanged end inserted loosely within the circular flange, a centrally apertured disk-like packing surrounding the nipple member and seated on its flanged end, and a reëntrant retaining lip formed on the circular flange snugly surrounding and forming a tubular, lateral support for the adjacent portion of the nipple member, the annular edge of said lip overhanging the flanged end of said nipple member to prevent separation of the members of the connection while permitting relative rotation thereof, fluid pressure within the connection causing the flanged end of the nipple member to press the packing against the inner edge of the lip and form a fluid-tight joint.

In testimony whereof, I have signed my name to this specification, in the presence of two subscribing witnesses.

ALBERT T. BOOTH.

Witnesses:
F. L. BINTEL,
OSCAR F. SAXCOMB.

---

It is hereby certified that in Letters Patent No. 994,815, granted June 13, 1911, upon the application of Albert T. Booth, of Waterbury, Connecticut, for an improvement in "Swivel Connections or Couplings," an error appears in the printed specification requiring correction as follows: Page 2, the name of the first-mentioned witness to the signature of the patentee should read *F. L. Bristol*, instead of "F. L. Bintel;" and that the said Letters Patent should be read with this correction therein that the same may conform to the record of the case in the Patent Office.

Signed and sealed this 25th day of July, A. D., 1911.

[SEAL.]

E. B. MOORE,
*Commissioner of Patents.* the members become separated accidentally, for the lip 12 overhangs not only the packing but also the flanged end 6 of the nipple member, the reëntrant lip also forming a strong and closely surrounding lateral support for the nipple member and preventing it from working out of alinement with the coupling member.

Changes or modifications in details of construction and arrangement may be made by those skilled in the art without departing from the spirit and scope of my invention as set forth in the claims annexed hereto.

Having fully described my invention, what I claim as new and desire to secure by Letters Patent is:

1. In a swivel connection, a coupling member having a threaded tubular neck provided at one end with a laterally extended, circular enlargement having an oppositely extended peripheral flange, a tubular nipple having a laterally-flanged end to extend within said peripheral flange and seat upon said circular enlargement, an annular disk-like packing surrounding the nipple and seated on its flanged end, and a reëntrant retaining lip on the peripheral flange axially turned toward the packing adjacent and closely surrounding the nipple to laterally support the same, said packing closing the joint between the flanged end of the nipple and the edge of the reëntrant lip while permitting relative rotation of said parts.

2. In a swivel connection, two tubular members having opposed and adjacent laterally enlarged ends, a circular flange on one of said ends loosely surrounding the end of the other member, said flange being turned inward and then axially toward the surrounded end, and an annular disk-like packing interposed between said surrounded end and the inner edge of said axially turned portion of the flange, to form a fluid-tight joint between the members of the connection, the axially turned reëntrant, tubular portion of the flange preventing axial and lateral separation of the tubular members while permitting relative rotation thereof.

3. In a swivel connection, a member having a threaded coupling neck provided at one end with a flat, circular enlargement with a circular flange extended oppositely from the neck, a coöperating nipple member having a laterally-flanged end inserted loosely within the circular flange, a centrally apertured disk-like packing surrounding the nipple member and seated on its flanged end, and a reëntrant retaining lip formed on the circular flange snugly surrounding and forming a tubular, lateral support for the adjacent portion of the nipple member, the annular edge of said lip overhanging the flanged end of said nipple member to prevent separation of the members of the connection while permitting relative rotation thereof, fluid pressure within the connection causing the flanged end of the nipple member to press the packing against the inner edge of the lip and form a fluid-tight joint.

In testimony whereof, I have signed my name to this specification, in the presence of two subscribing witnesses.

ALBERT T. BOOTH.

Witnesses:
F. L. BINTEL,
OSCAR F. SANCOMB.

---

It is hereby certified that in Letters Patent No. 994,815, granted June 13, 1911, upon the application of Albert T. Booth, of Waterbury, Connecticut, for an improvement in "Swivel Connections or Couplings," an error appears in the printed specification requiring correction as follows: Page 2, the name of the first-mentioned witness to the signature of the patentee should read *F. L. Bristol*, instead of "F. L. Bintel;" and that the said Letters Patent should be read with this correction therein that the same may conform to the record of the case in the Patent Office.

Signed and sealed this 25th day of July, A. D., 1911.

[SEAL.]

E. B. MOORE,
*Commissioner of Patents.*

Correction in Letters Patent No. 994,815.

It is hereby certified that in Letters Patent No. 994,815, granted June 13, 1911, upon the application of Albert T. Booth, of Waterbury, Connecticut, for an improvement in "Swivel Connections or Couplings," an error appears in the printed specification requiring correction as follows: Page 2, the name of the first-mentioned witness to the signature of the patentee should read *F. L. Bristol*, instead of "F. L. Bintel;" and that the said Letters Patent should be read with this correction therein that the same may conform to the record of the case in the Patent Office.

Signed and sealed this 25th day of July, A. D., 1911.

[SEAL.]

E. B. MOORE,
*Commissioner of Patents.*